US009013966B1

(12) United States Patent
Matsumoto et al.

(10) Patent No.: US 9,013,966 B1
(45) Date of Patent: Apr. 21, 2015

(54) MAGNETIC RECORDING HEAD AND DISK DEVICE INCLUDING THE SAME

(71) Applicant: Kabushiki Kaisha Toshiba, Tokyo (JP)

(72) Inventors: Takuya Matsumoto, Tokyo (JP); Tomoko Taguchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/195,126

(22) Filed: Mar. 3, 2014

(30) Foreign Application Priority Data

Oct. 24, 2013 (JP) ................. 2013-221317

(51) Int. Cl.
G11B 11/00 (2006.01)
G11B 5/48 (2006.01)
G11B 5/10 (2006.01)

(52) U.S. Cl.
CPC ................ *G11B 5/4866* (2013.01); *G11B 5/10* (2013.01)

(58) Field of Classification Search
None
See application file for complete search history.

(56) References Cited

U.S. PATENT DOCUMENTS

| 2007/0139818 | A1* | 6/2007 | Shimazawa et al. | 360/126 |
| 2010/0091619 | A1* | 4/2010 | Hirata et al. | 369/13.24 |
| 2010/0103553 | A1* | 4/2010 | Shimazawa et al. | 360/59 |
| 2010/0172220 | A1* | 7/2010 | Komura et al. | 369/13.33 |
| 2011/0058272 | A1* | 3/2011 | Miyauchi et al. | 360/59 |
| 2012/0045662 | A1* | 2/2012 | Zou et al. | 428/810 |

FOREIGN PATENT DOCUMENTS

JP 2009-146097 A 7/2009

* cited by examiner

*Primary Examiner* — Thang Tran
(74) *Attorney, Agent, or Firm* — Patterson & Sheridan, LLP

(57) ABSTRACT

A recording head for recording information on a rotating recording medium of a storage device includes a main magnetic pole which generates a recording magnetic field in a direction perpendicular to a recording medium facing surface of the magnetic recording head, and a light generating element which is provided on a leading side of the main magnetic pole, and generates light for heating the recording layer of the recording medium. The main magnetic pole includes an end surface facing the light generating element that is inclined with respect to the direction perpendicular to the recording medium facing surface toward the light generating element.

20 Claims, 12 Drawing Sheets

MAGNETIC RECORDING HEAD AND DISK DEVICE INCLUDING THE SAME

CROSS-REFERENCE TO RELATED APPLICATION

This application is based upon and claims the benefit of priority from Japanese Patent Application No. 2013-221317, filed Oct. 24, 2013, the entire contents of which are incorporated herein by reference.

FIELD

Embodiments described herein relate to a magnetic recording head that employs a heat assist recording method and a disk device including the same.

BACKGROUND

Examples of a disk device include a magnetic disk device having a magnetic disk arranged in a case as a recording medium, a spindle motor which supports and rotates the magnetic disk, and a magnetic head which reads and writes information from and to the magnetic disk. The magnetic head includes a recording head for writing and a reading for reading.

Recently, there has been proposed a magnetic head that employs perpendicular magnetic recording and heat assist magnetic recording methods in order to increase a recording intensity and a capacity of the magnetic disk device and reduce the size thereof. The magnetic head includes a near field light generating element which generates a near field light toward a recording layer of a recording medium and a waveguide for propagating a light for generating the near field light. With this magnetic head, when writing information, a medium recording layer having a perpendicular magnetic anisotropy is locally heated by the near field light generated from the distal end of the near field light generating element, as a way to reduce the coercive force in the recording layer portion and increase the recording intensity.

In such a device, the near field light generating element and the main magnetic pole are positioned just several nanometers apart. As a result, the electric charges concentrated on the near field light generating element and the electric charges concentrated on the main magnetic pole mutually react with each other. This effect reduces the near field light intensity, and hinders the coercive force in the recording layer portion from fully decreasing. By positioning the near field light generating element and the main magnetic pole to be farther away from each other, the magnetic field intensity in the heated area of the recording medium is weakened. Therefore, the coercive force in the recording layer portion has to be further reduced by raising a laser power of a light source, so that the near field light intensity may be increased and the heating temperature of the recording layer may be raised. In such a case, however, since the heated area of the recording layer expands as a result, heat spreads in a direction of track width. As the result, information of the adjacent tracks may be degraded or erased, which limits a high recording intensity of a disk device.

DETAILED DESCRIPTION

According to one embodiment, there are provided a magnetic recording head and a disk device including the same, that are capable of better preventing erasing of information stored in adjacent tracks while increasing a recoding density.

In general, according to one embodiment, a magnetic recording head for recording information on a rotating recording medium of a storage drive, includes a main magnetic pole which generates a recording magnetic field in a direction perpendicular to a recording medium facing surface of the magnetic recording head, and a light generating element which is provided on a leading side of the main magnetic pole, and generates light to heat the recording layer of the recording medium. The main magnetic pole includes an end surface facing the light generating element that is inclined with respect to the direction perpendicular to the recording medium facing surface toward the light generating element.

Hereinafter, various embodiments will be described with reference to the drawings.

First Embodiment

Figure 1:
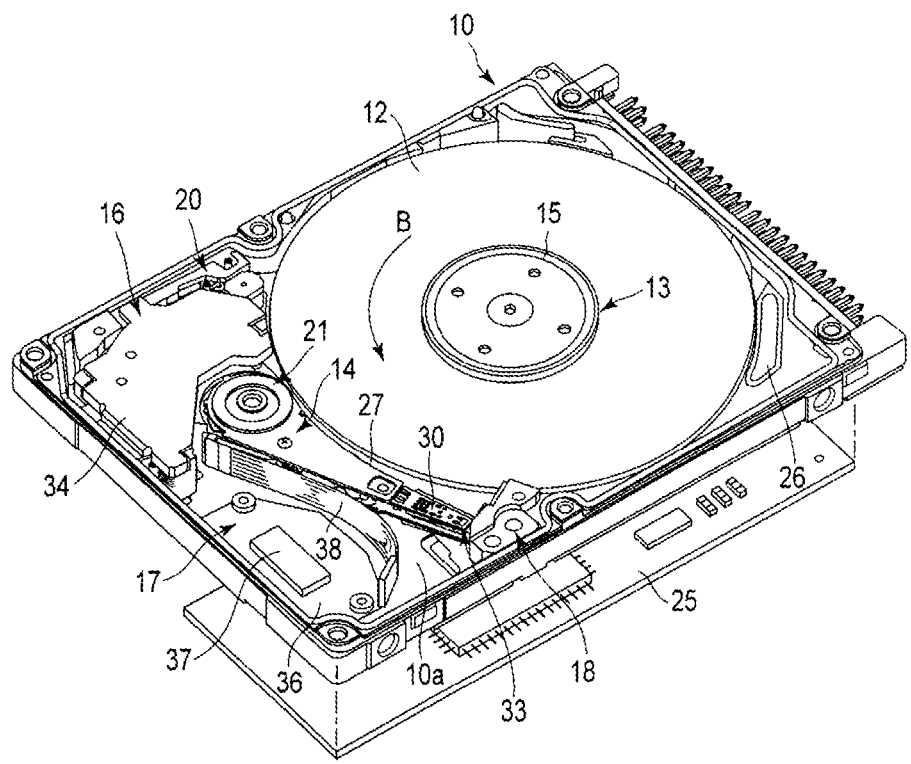
FIG. 1 is a perspective view showing a hard disk drive (hereinafter, referred to as an HDD) according to a first embodiment.
Figure 2:
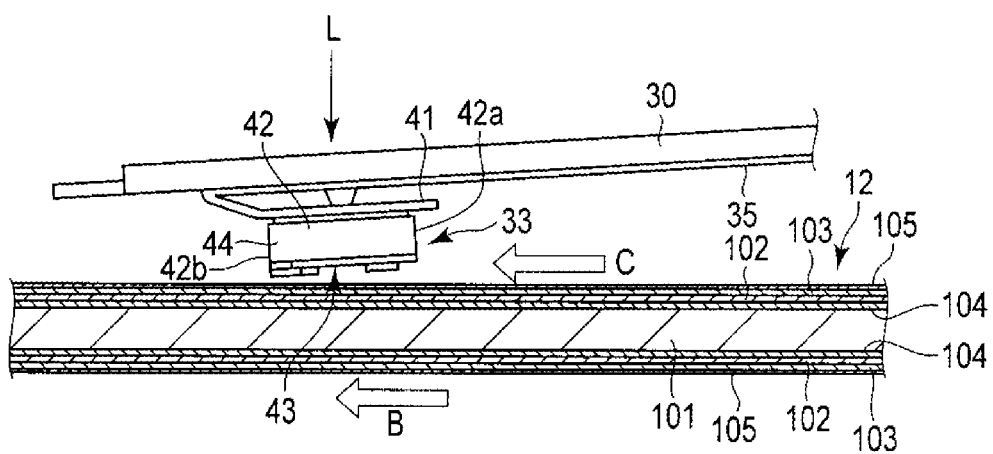
FIG. 2 is a side elevational view showing a magnetic head and a suspension in the HDD.

FIG. 1 shows the inner structure of an HDD according to a first embodiment in a state where a top cover is removed and FIG. 2 shows a magnetic head in a floating state. As illustrated in FIG. 1, the HDD includes a casing 10. This casing 10 has a base 10a in a shape of a rectangular box that is open-topped and a top cover, not illustrated, in a shape of a rectangular plate. The top cover is screwed to the base 10a by a plurality of screws so as to close the top opening of the base 10a. As the result, an inside of the casing 10 is kept airtight and may be ventilated with the outside only through a breather filter 26.

On the base 10a, there are provided a magnetic disk 12 as a recording medium and a mechanism portion. The mechanism portion includes: a spindle motor 13 which supports and rotates the magnetic disk 12; a plurality of, for example, two magnetic heads 33 which record and read information to and from the magnetic disk; a head actuator 14 which movably supports the magnetic heads 33 with respect to a surface of the magnetic disk 12; and a voice coil motor (hereinafter, referred to as VCM) 16 which rotates and positions the head actuator. On the base 10a, a ramp load mechanism 18 which holds the magnetic heads 33a at positions far from the magnetic disk 12 when the magnetic heads 33 are moved to the outermost periphery of the magnetic disk 12, a latch mechanism 20 which holds the head actuator 14 at an evacuation position when an impact or the like is applied to the HDD, and a board unit 17 where electric components such as a connector and the like are mounted.

A control circuit board 25 is screwed on an outer surface of the base 10a and positioned facing a bottom wall of the base 10a. The control circuit board 25 controls the operations of the spindle motor 13, the VCM 16, and the magnetic heads 33 through the board unit 17.

As illustrated in FIG. 1, the magnetic disk 12 is coaxially fitted on a hub of the spindle motor 13 and clamped by a clamp spring 15 screwed to an upper end of the hub so that the magnetic disk 12 is fixed to the hub. The magnetic disk 12 is rotated by the spindle motor 13 used as a drive motor in a direction indicated by an arrow B at a predetermined speed.

The head actuator 14 includes a bearing portion 21 fixed on the bottom wall of the base 10a and a plurality of arms 27 which extend from the bearing portion 21. These arms 27 are positioned in parallel to the surface of the magnetic disk 12, at predetermined intervals therebetween, and extend in the same direction from the bearing portion 21. The head actuator 14 includes elastically deformable suspensions 30 each having a shape of long plate. Each suspension 30 is formed by a plate spring, with its proximal end fixed to a distal end of the arm 27 by spot welding or adhesion, and extends from the arm 27. The respective suspensions 30 may be integrally formed with the respectively corresponding arms 27. The magnetic heads 33 are supported at the extending ends of the suspensions 30. The arms 27 and the suspensions 30 make up a head suspension, and the head suspension and the magnetic heads 33 make up a head suspension assembly.

As illustrated in FIG. 2, each magnetic head 33 includes a substantially cuboid shaped slider 42 and a head portion 44 for recording and reading which is provided at the outflow end (trailing end) of this slider. The magnetic head 33 is fixed to a gimbal spring 41 provided at a distal end portion of the suspension 30. To each magnetic head 33, a head load L directed toward the surface of the magnetic disk 12 is applied due to the elasticity of the suspension 30. The two arms 27 are positioned in parallel to each other at the predetermined interval, and the suspensions 30 attached to the arms and the magnetic heads 33 face each other with the magnetic disk 12 interposed therebetween.

Each magnetic head 33 is electrically connected to a main flexible printed circuit (hereinafter, referred to as a main FPC) 38 through a relay flexible printed circuit board (hereinafter, referred to as a relay FPC) 35 fixed to the suspension 30 and the arm 27.

As illustrated in FIG. 1, the board unit 17 includes an FPC main body 36 formed of a flexible printed circuit board and the main FPC 38 which extends from this FPC main body. The FPC main body 36 is fixed to the bottom surface of the base 10a. On the FPC main body 36, electric components including the connector 37 are mounted. The extending end of the main FPC 38 is connected to the head actuator 14 and further connected to the magnetic head 33 through each relay FPC 35.

The VCM 16 includes a supporting frame, not illustrated, which extends from the bearing portion 21 in a direction opposite to the arms 27 and a voice coil which is supported by the supporting frame. In a state where the head actuator 14 is built in the base 10a, the voice coil is positioned between a pair of yokes 34 fixed on the base 10a, and forms the VCM 16 together with these yokes 34 and magnets fixed to the yokes 34.

Bypassing a current to the voice coil of the VCM 16 in a state where the magnetic disk 12 is rotating, the head actuator 14 is rotated and the magnetic head 33 is moved to and positioned above a desired track of the magnetic disk 12. Under these circumstances, the magnetic head 33 is moved along the radial direction of the magnetic disk 12 between an inner peripheral portion and an outer peripheral portion of the magnetic disk.

Figure 3:
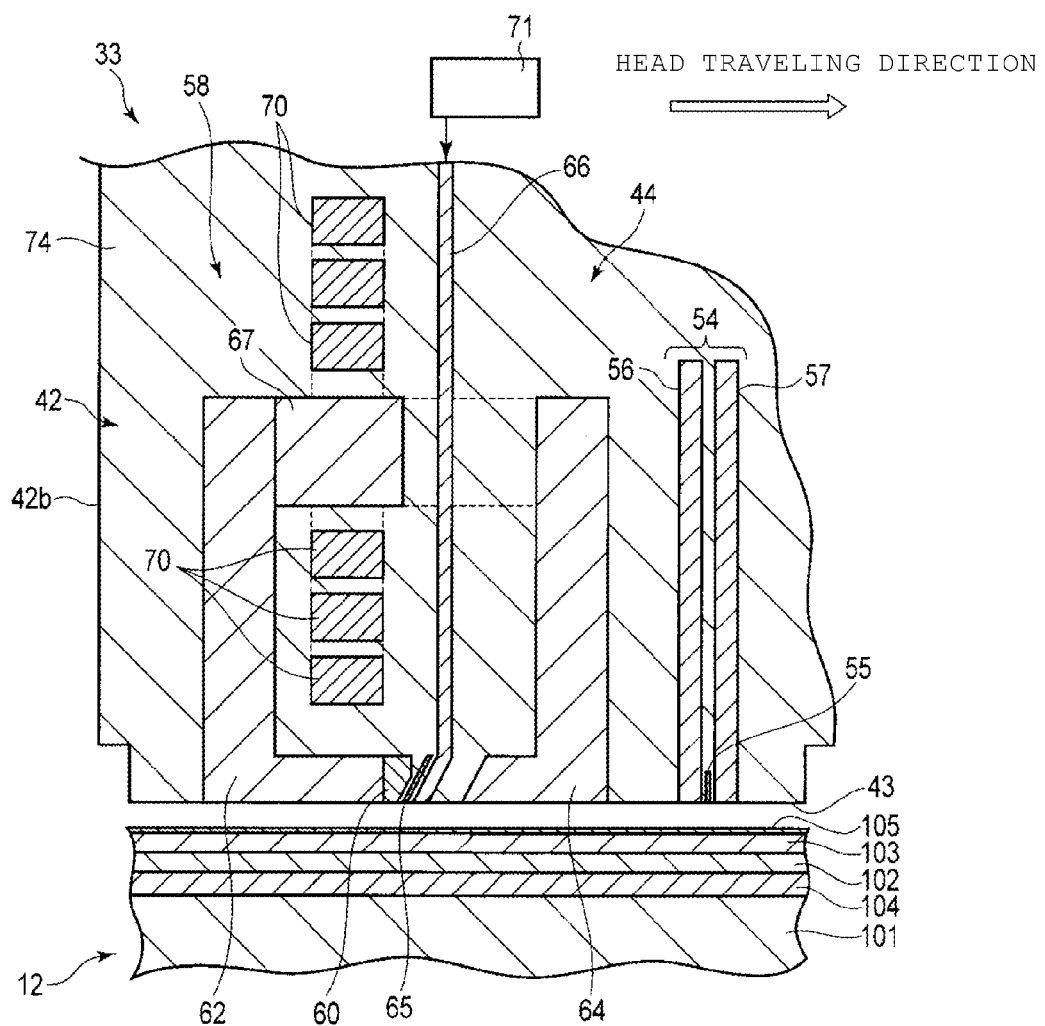
FIG. 3 is an enlarged cross-sectional view showing the head portion of the magnetic head.

Next, the structure of the magnetic disk 12 and the magnetic head 33 will be described in detail. FIG. 3 is an enlarged cross-sectional view of the head portion 44 of the magnetic head 33 and the magnetic disk 12.

As illustrated in FIGS. 1 to 3, the magnetic disk 12 includes a substrate 101 which is formed in a disk shape, for example, with a diameter of about 2.5 inches (6.35 cm) and made of a nonmagnetic material. On each surface of the substrate 101, there are provided a perpendicular recording layer 103 having a large magnetic anisotropy in a direction perpendicular to the disk surface, a crystal orientation layer 102 which is laminated on the perpendicular recording layer 103 in order to improve the orientation of the perpendicular recording layer 103, a heat sink layer 104 which is laminated on the crystal orientation layer 102 in order to restrain an expansion of a heated area, and a protective film 105 which covers the perpendicular recording layer 103.

As illustrated in FIGS. 2 and 3, the magnetic head 33 is formed as a floating type head, having a slider 42 formed in a substantially cuboid shape and a head portion 44 formed at an end of the slider on an outflow (trailing) side. The slider 42 is formed of, for example, a sintered body of alumina and titanium carbide (ALTIC), and the head portion 44 is formed by laminating thin films.

The slider 42 has a rectangular medium facing surface (air bearing surface (ABS)) 43 facing the surface of the magnetic disk 12. The slider 42 floats due to an air flow C generated between the disk surface and the medium facing surface 43 by the rotation of the magnetic disk 12. The direction of the air flow C agrees with the rotational direction B of the magnetic disk 12. The slider 42 is arranged so that the longitudinal direction of the medium facing surface 43 substantially agrees with the direction of the air flow C with respect to the surface of the magnetic disk 12.

The slider 42 has a leading end 42a positioned on an inflow side of the air flow C and a trailing end 42b positioned on an outflow side of the air flow C. On the medium facing surface 43 of the slider 42, a leading step, a trailing step, a side step, and a negative-pressure cavity, not illustrated, are formed.

As illustrated in FIG. 3, the head portion 44 includes a reading head 54 and a recording head (magnetic recording head) 58 formed at the trailing end 42b of the slider 42 in a thin film process, and the heads are formed as separate magnetic heads.

The reading head 54 is formed with a magnetic film 55 having a magneto-resistive effect and shield films 56 and 57 which are arranged on a trailing side and a leading side of the magnetic film 55 so as to sandwich the magnetic film 55 therebetween. The lower ends of the magnetic film 55 and the shield films 56 and 57 are exposed on the ABS 43 of the slider 42.

Figure 4:
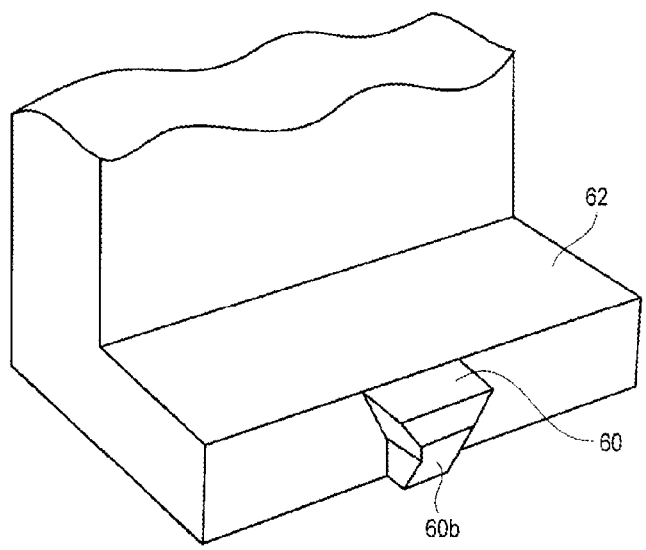
FIG. 4 is a perspective view schematically showing a main magnetic pole and a write shield of the recording head of the magnetic head.
Figure 5:
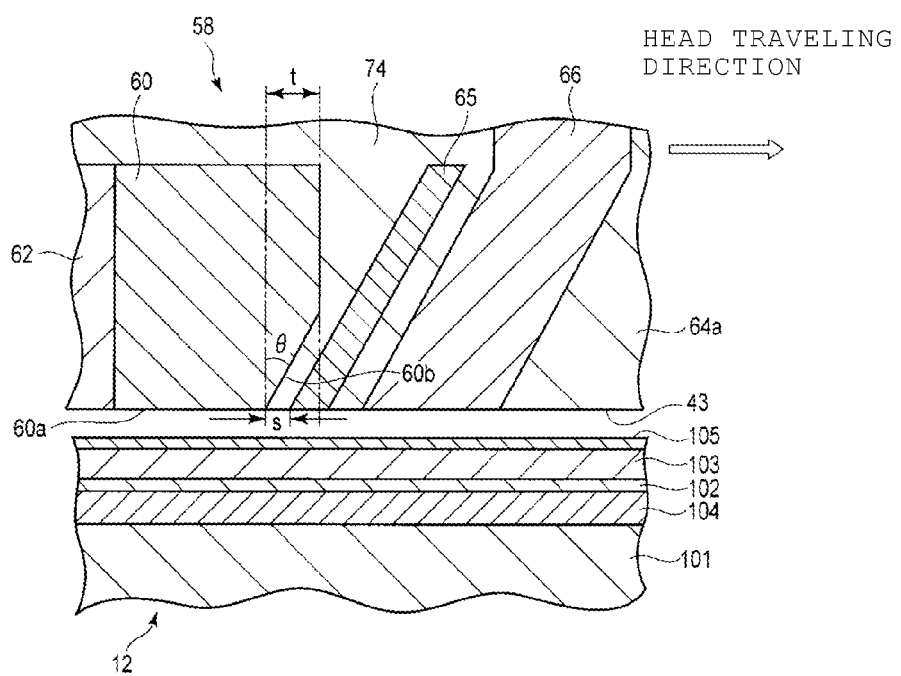
FIG. 5 is an enlarged cross-sectional view showing an end portion of the recording head on an air bearing surface (ABS) side.
Figure 6:
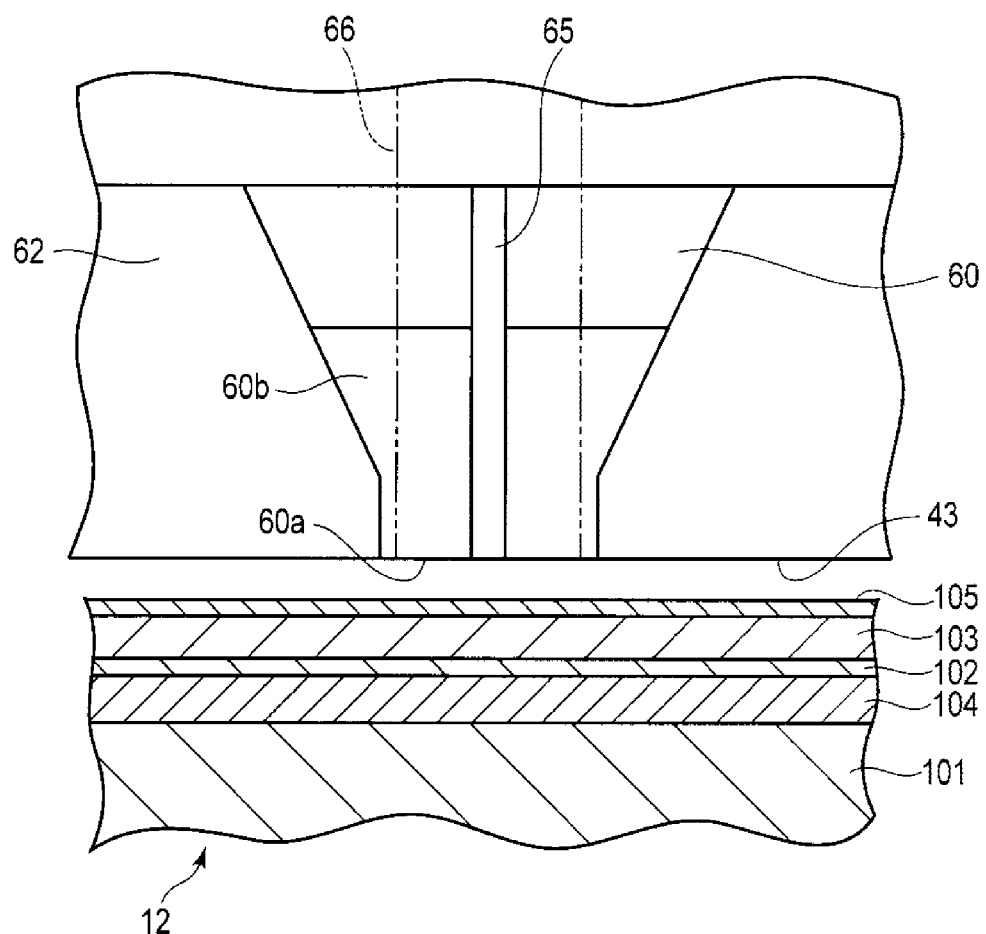
FIG. 6 is a side elevational view of the end portion of the recording head on the ABS side as viewed from the leading end of a slider.

The recording head 58 is provided on the side of the trailing end 42b of the slider 42, with respect to the reading head 54. FIG. 4 is a perspective view schematically showing a main magnetic pole and a trailing yoke of the recording head 58, FIG. 5 is an enlarged cross-sectional view showing a distal end portion of the recording head 58 on the ABS 43 side along the down-track direction, and FIG. 6 is a side elevational view of the end portion of the recording head on the ABS side as viewed from the side of the leading end of a slider.

As illustrated in FIGS. 3 and 4, the recording head 58 includes: a main magnetic pole 60 which is made of a soft magnetic material having a high permeability and a high saturation flux density to generate a recording magnetic field in a perpendicular direction to the surface of the magnetic disk 12 (with respect to the recording layer 103); a trailing yoke 62 which is made of a soft magnetic material for passing a magnetic flux to the main magnetic pole 60 and is positioned on the trailing side of the main magnetic pole 60 and magnetically connected there; a return shield magnetic pole 64 which is made of a soft magnetic material and is provided on the leading side of the main magnetic pole 60 in order to efficiently close a magnetic path right below the main magnetic pole; a joint portion 67 which physically connects the upper portion of the trailing yoke 62 (end portion away from the ABS 43) to the return shield magnetic pole 64; a recording coil 70 which is wound around the magnetic path including the trailing yoke 62 and the return shield magnetic pole 64 for passing a magnetic flux to the main magnetic pole 60; a near field light generating element 65 which is provided on the leading side of the main magnetic pole 60 to generate a near field light for heating the recording layer 103 of the magnetic disk 12; and a waveguide 66 which propagates a light for generating a near field light to the near field light generating element 65. The respective distal end surfaces of the main magnetic pole 60, the trailing yoke 62, the near field light generating element 65, and the return shield magnetic pole 64 are exposed on the ABS 43 of the slider 42 and aligned on the same plane.

A current to be supplied to the recording coil 70 is controlled by a control circuit board (controller) 25 of the HDD. When writing a signal to the magnetic disk 12, a predetermined current is supplied from a power source to the recording coil 70, to pass a magnetic flux to the main magnetic pole 60 and generate a magnetic field. Further, as a light source, a laser beam generated from a laser diode 71 is supplied to the waveguide 66, and through the waveguide 66, it is further supplied to the near field light generating element 65.

As illustrated in FIGS. 3 to 6, the main magnetic pole 60 is formed such that its distal end is tapered toward the ABS 43. The main magnetic pole 60 includes a distal end surface 60a exposed on the ABS 43 and a magnetic pole end surface 60b extending from the ABS 43 upwardly, or, in a direction away from the ABS and facing the near field light generating element 65.

At least a part of the magnetic pole end surface 60b, e.g., about a half of the same surface on the ABS 43 side here, extends from the ABS 43 at a slant of angle θ toward the near field light generating element 65, with respect to a direction perpendicular to the ABS 43. That is, the magnetic pole end surface 60b is inclined toward the leading side by the angle θ with respect to a direction perpendicular to the ABS 43.

The near field light generating element (which is, e.g., a plasmon generator) 65 is inclined similarly to the magnetic pole end surface 60b with a spacing (hereinafter referred to as "gap length") S interposed therebetween such that they face each other in parallel. That is, the near field light generating element 65 is inclined toward the leading side with respect to a direction perpendicular to the ABS 43. An end of the near field light generating element 65 on the ABS side is formed parallel to the ABS 43 and on the same surface as the ABS 43. According to this, at least a part of the near field light generating element 65, that is the end portion on the ABS side, is positioned overlapping with the magnetic pole end surface 60b in a direction perpendicular to the ABS 43.

The near field light generating element 65 is preferably made of Au, Pd, Pt, Rh, or Ir, or a combination alloy of some of them. An insulating layer (protective insulating layer 74) is disposed between the main magnetic pole 60 and the near field light generating element 65, and the insulating layer is preferably made of oxide such as $SiO_2$, $Al_2O_3$, and the like.

The waveguide 66 extends from the ABS 43 to the upper end of the slider 42, or to the end on the suspension side. The end portion of the waveguide 66 on the ABS 43 side is inclined along the near field light generating element 65 with a spacing interposed therebetween such that the inclined surfaces thereof are substantially parallel. As illustrated in FIG. 6, the width of the waveguide 66 at the inclined portion is formed larger than the width of the near field light generating element 65 at the inclined portion and substantially equal to or less than the width of the main magnetic pole 60. The insulating layer (protective insulating layer 74) is disposed between the waveguide 66 and the near field light generating element 65.

The return shield magnetic pole 64 is substantially formed in an L-shape, and the distal end surface thereof is exposed on the ABS 43 and positioned on the same plane as the ABS 43. Further, the end surface of the return shield magnetic pole 64 on the trailing side faces the distal end portion of the waveguide 66 with a predetermined spacing.

As illustrated in FIGS. 3 and 5, the reading head 54 and the recording head 58 are covered with a non-magnetic protective insulating film 74, except the portion exposed on the ABS 43 of the slider 42. The protective insulating film 74 forms the outer shape of the head portion 44.

In the HDD configured as described above, the VCM 16 is driven, hence to rotate the head actuator 14, and the magnetic head 33 is moved to the magnetic disk 12 above a desired track and positioned there. Further, the magnetic head 33 floats due to the air flow C generated between the disk surface and the ABS 43 according to the rotation of the magnetic disk 12. During the operation of the HDD, the ABS 43 of the slider 42 is kept facing the disk surface with a space. As illustrated in FIG. 2, the magnetic head 33 floats at a slant such that the recording head 58 portion of the head portion 44 may most closely approach the surface of the magnetic disk 12. In this state, recorded information is read from the magnetic disk 12 by the reading head 54 and information (signal) is written in the magnetic disk 12 by the recording head 58.

During writing of information, the recording coil 70 excites the main magnetic pole 60, and applies a recording magnetic field in a perpendicular direction to the recording layer 103 of the magnetic disk 12 just below the main magnetic pole 60 to record the information with a desired track width. Further, a laser beam is supplied from the laser diode 71 to the near field light generating element 65 through the waveguide 66, hence to generate a near field light from the near field light generating element 65. By locally heating the recording layer 103 of the magnetic disk 12 with the near field light generated from the distal end of the near field light generating element 65, a coercive force in the recording layer portion is reduced. In this area of reduced coercive force, a recording magnetic field from the main magnetic pole 60 is applied, to write a signal there. Thus, by writing a signal in the area where the recording layer 103 portion is locally heated to reduce the coercive force fully, it is possible to record at a high density.

According to the embodiment, by inclining the magnetic pole end surface 60b of the main magnetic pole 60 facing the near field light generating element 65, a magnetic field intensity applied by the head to the area on the recording layer 103 heated by the near field light may be increased. Therefore, a heating temperature of the recording layer necessary for recording may be reduced. As the result, the heated area may be restrained from spreading in the magnetic disk 12, hence to prevent the information stored in the adjacent tracks from erasing. Accordingly, it is effective in increasing a recording density of the HDD.

Figure 7:
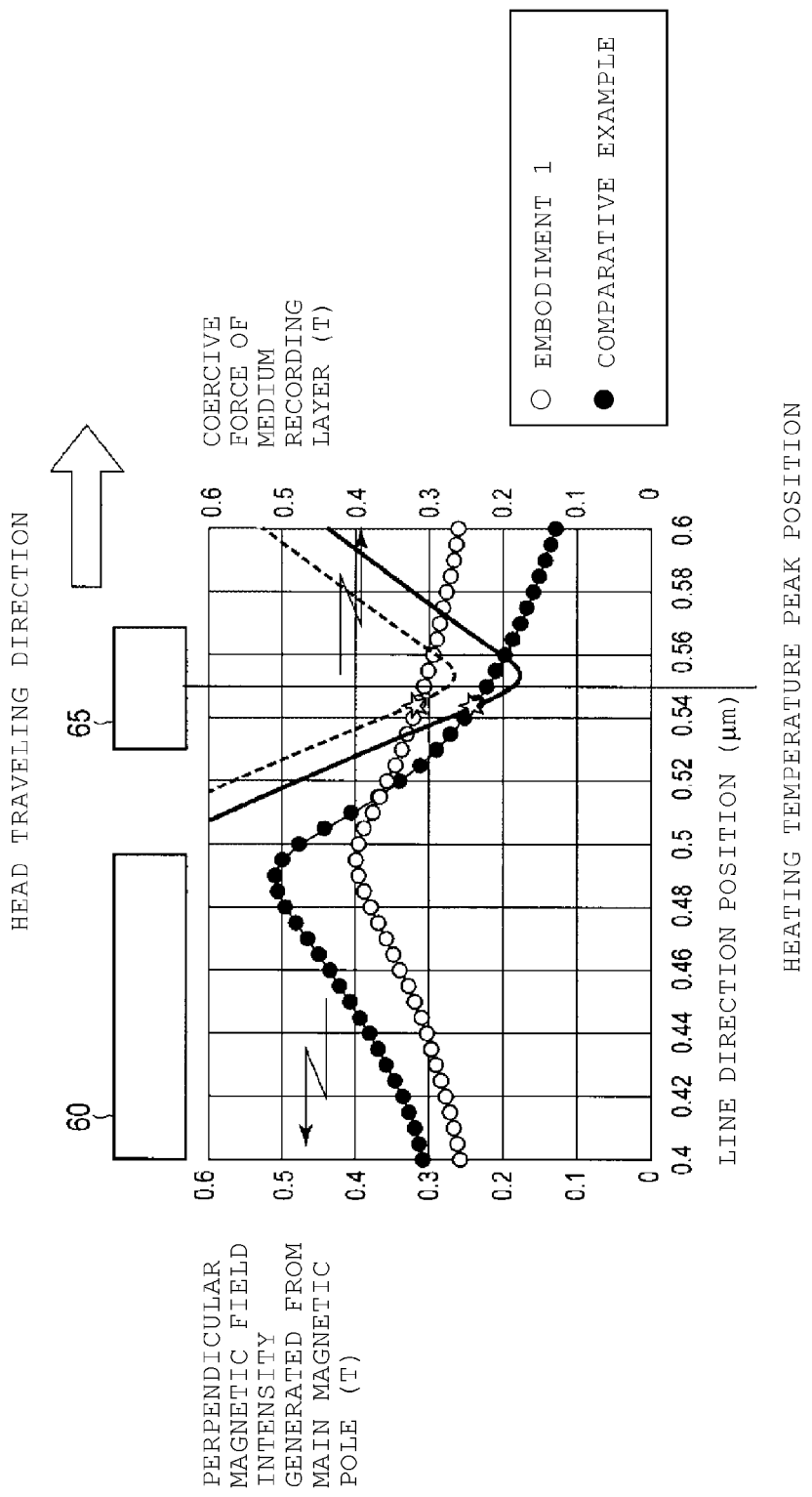
FIG. 7 is a view showing the relationship between a magnetic field intensity distribution and a coercive force of the recording layer, for a recording head of the first embodiment and a recording head of a comparative example.

FIG. 7 shows the relationship between a magnetic field intensity distribution and a coercive force of the recording layer for the magnetic recording head according to the first embodiment and a recording head according to a comparative example. In the recording head according to the comparative example, the magnetic pole end surface of the main magnetic pole facing the near field light generating element extends perpendicular to the ABS. In the magnetic recording head according to the embodiment, an angle (incline angle) θ made by the magnetic pole end surface 60b facing the near field light generating element 65 and a film growing surface (a direction perpendicular to the ABS) is set to be 45° and a gap length S on the ABS 43 between the near field light generating element 65 and the main magnetic pole 60 is set to be 35 nm.

FIG. 7 shows a positional relation on the ABS 43 between the near field light generating element 65 and the main magnetic pole 60. The magnetic pole end surface 60b facing the near field light generating element 65 corresponds to the position of 0.5 μm in a line direction position of FIG. 7 and the lateral surface of the near field light generating element 65 facing the main magnetic pole 60 corresponds to the position of 0.535 μm in the line direction position.

In FIG. 7, a line indicated by a plot of ○ shows a distribution of the magnetic field intensity generated from the main magnetic pole 60 in a perpendicular direction to a medium when a current flowing to the recording coil 70 is set at 60 mA in the magnetic recording head according to the first embodiment. A line indicated by a plot of ● shows a distribution of a magnetic field intensity generated from the main magnetic pole in a perpendicular direction to a medium when a current flowing to the recording coil is set at 60 mA in the recording head according to the comparative example.

The recording layer 103 is heated by a near field light generated by the near field light generating element 65, hence to reduce a coercive force in the recording layer. In FIG. 7, a dotted characteristic line indicates a change of the coercive force in the recording layer 103 when a laser power of a laser beam supplied from the laser diode 71 is set at 17 mW. A solid characteristic line indicates a change of the coercive force in the recording layer when the laser power of 22 mW is applied.

In the heat assist magnetic recording method, a recording transition point is determined by an intersection (indicated by a star in FIG. 7) of the coercive force in a medium recording layer, which is cooled after once being heated, and the magnetic field intensity in a perpendicular direction to a medium, which is generated from the main magnetic pole. When a laser power of 17 mW is applied, in the recording head according to the embodiment, there is an intersection of the coercive force in a medium recording layer and the magnetic field intensity, generated from the main magnetic pole 60, in a perpendicular direction to a medium. Thus, it is possible to write to the recording layer 103 and a good quality of signal may be obtained. On the other hand, in the recording head according to the comparative example, there is no intersection of the coercive force in a medium recording layer and the magnetic field intensity, generated from the main magnetic pole, in a perpendicular direction to a medium. Thus, it is not possible to write to the recording layer. In order to determine a boundary of recording bits (in order to obtain an intersection of the coercive force in a medium recording layer and the magnetic field intensity in a perpendicular direction to a medium), in the recording head according to the comparative example, a laser power of 22 mW has to be applied. In short, a heating temperature of the recording medium has to be raised. In the first embodiment, since the magnetic field intensity applied by the head to the heated area may be increased, it is found that a heating temperature necessary for recording may be set lower than that of the comparative example.

Figure 8:
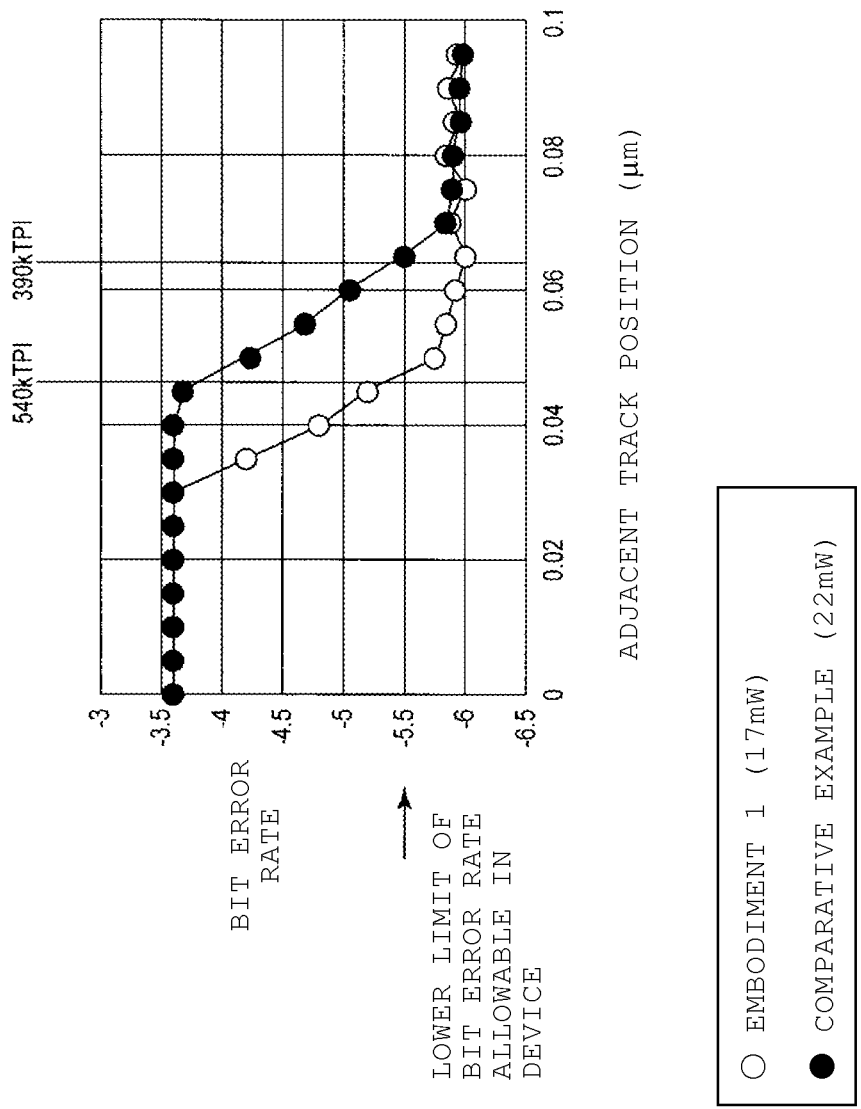
FIG. 8 is a view showing the bit error rate for the recording head of the first embodiment and the recording head of the comparative example.

FIG. 8 shows the result of measuring a bit error rate of a bit that failed during erasing in the initially recorded state, while changing a position of the adjacent recording track, in the recording head according to the first embodiment and the recording head according to the comparative example. For both the initial recording and the adjacent recording, random data is used. The adjacent recording is performed 1000 times.

A characteristic line indicated by the plot of ○ indicates a bit error rate of the recording head according to the embodiment, and a characteristic line indicated by the plot of ● indicates a bit error rate of the recording head according to the comparative example. A laser power is adjusted so that the on-track bit error rate in each recording head may be a maximum: the laser power necessary for the recording head according to the embodiment is 17 mW, and the laser power necessary for the recording head according to the comparative example is 22 mW.

In the embodiment, the lower limit of the allowable bit error rate at a drive is defined as $10^{-5.5}$. When estimating TPI (tracks per inch) achievable from the adjacent track position satisfying the lower limit, it is 530 kTPI in the recording head according to the embodiment, while in the recording head of the comparative example, it is degraded to 390 kPTI. That is, by using the recording head of the embodiment, recording density may be improved. Here, when the same laser power of 17 mA as in the embodiment is applied to the recording head of the comparative example, a signal is not written in a recording medium and a recording signal is not obtained.

According to the embodiment, as illustrated in FIG. 7, since the magnetic field intensity applied by the head to the heated area of the recording layer may be increased, a heating temperature necessary for recording may be reduced. As the result, the heated area in a magnetic recording medium may be restrained from spreading, hence to prevent erasure of information stored in the adjacent tracks.

In the magnetic recording head 58 according to the embodiment, the angle (incline angle) θ made by the magnetic pole end surface 60b facing the near field light generating element 65 and a film growing surface (a direction perpendicular to the ABS) is effective in the range of 0°<θ<90° (according to the definition of the incline angle θ, θ=90° is the same as θ=0° in the recording head of the comparative example).

Figure 9:
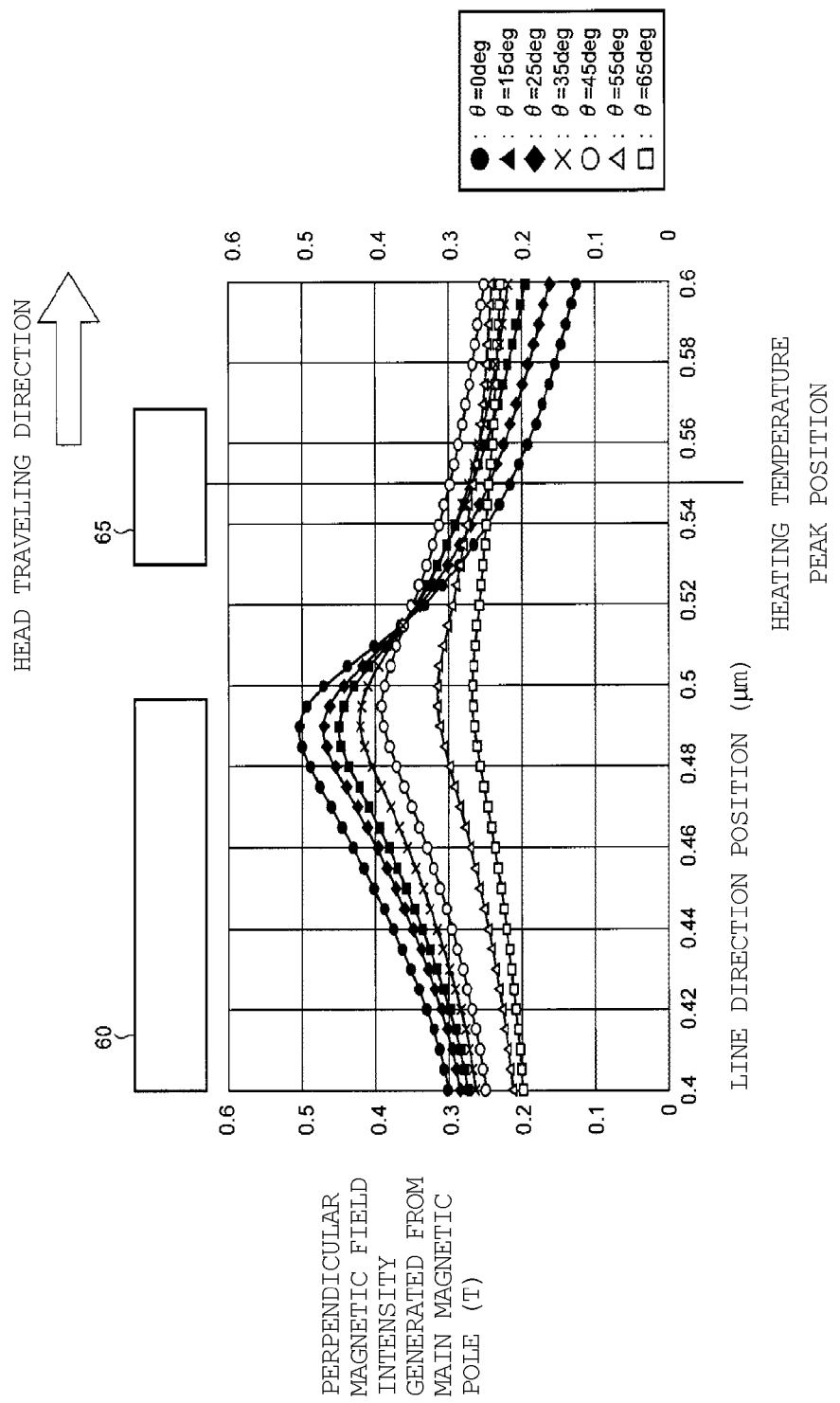
FIG. 9 is a view showing the magnetic field intensity distribution when the incline angle of a magnetic pole end surface of the recording head is changed variously.

FIG. 9 shows the magnetic field intensity distribution when the incline angle θ of the magnetic pole end surface of the recording head is varied. Further, in FIG. 9, each characteristic line is obtained by plotting the magnetic field intensity generated from the main magnetic pole in a perpendicular direction to a medium when a current flowing to the recording coil 70 is set at 60 mA while changing the incline angle θ. A reference mark ● is a magnetic field intensity profile of θ=0° (the recording head of the comparative example), ♦ is a magnetic field intensity profile of θ=15°, ■ is a magnetic field intensity profile of θ=25°, x is a magnetic field intensity profile of θ=35°, ○ is a magnetic field intensity profile of θ=45°, Δ is a magnetic field intensity profile of θ=55°, and □ is a magnetic field intensity profile of θ=65°. From FIG. 9, it is found that the magnetic field intensity applied by the head to the heated area of the recording layer 103 may be increased at the range of the incline angle 0°<θ<90°.

Figure 10:
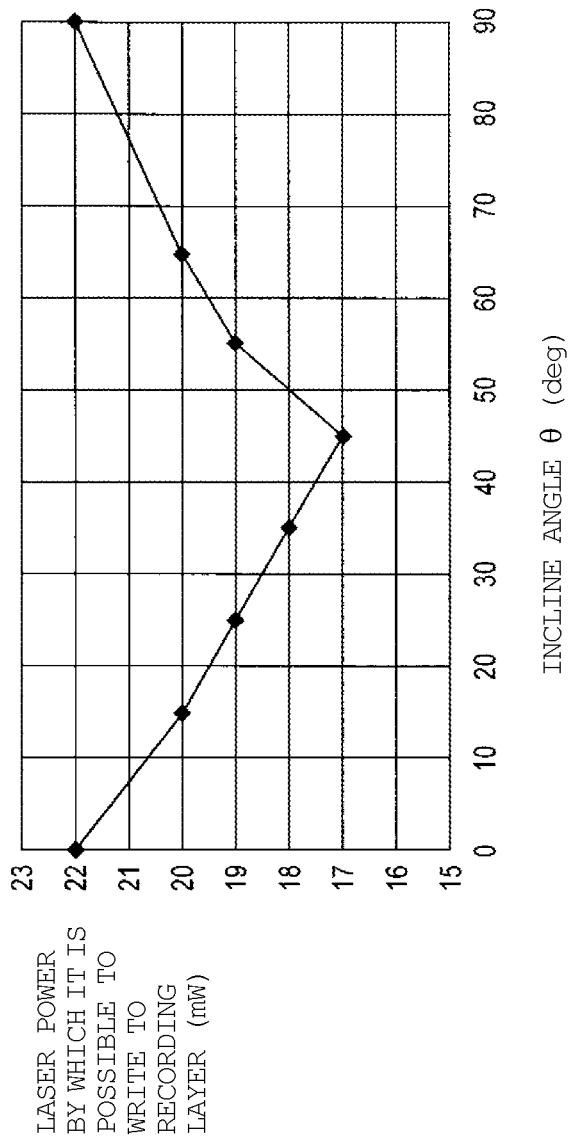
FIG. 10 is a view showing the relationship between the incline angle of the magnetic pole end surface of the recording head according to the first embodiment and a laser power for writing.

FIG. 10 shows the relationship between the incline angle θ of the magnetic pole end surface of the recording head according to the first embodiment and the laser power for writing. It is found from FIG. 10 that the laser power by which it is possible to write to the recording layer in the range of the incline angle 0°<θ<90° is more reduced than that of the recording head (θ=0°) of the comparative example. In the first embodiment, when θ=45°, the laser power may be most reduced.

As illustrated in FIG. 5, with respect to the gap length S between the main magnetic pole 60 and the near field light generating element 65, in the ABS 43, a distance (inclination width) t between the trailing end and the leading end of the magnetic pole end surface 60b of the main magnetic pole 60 in the vicinity of the ABS 43 side is preferably S<t. That is, in a direction perpendicular to the ABS 43, it is preferable that the near field light generating element 65 and the magnetic pole end surface 60b are positioned in an overlapped way and that at least a part of the near field light generating element 65 is interposed between the ABS 43 and the magnetic pole end surface 60b.

Figure 11:
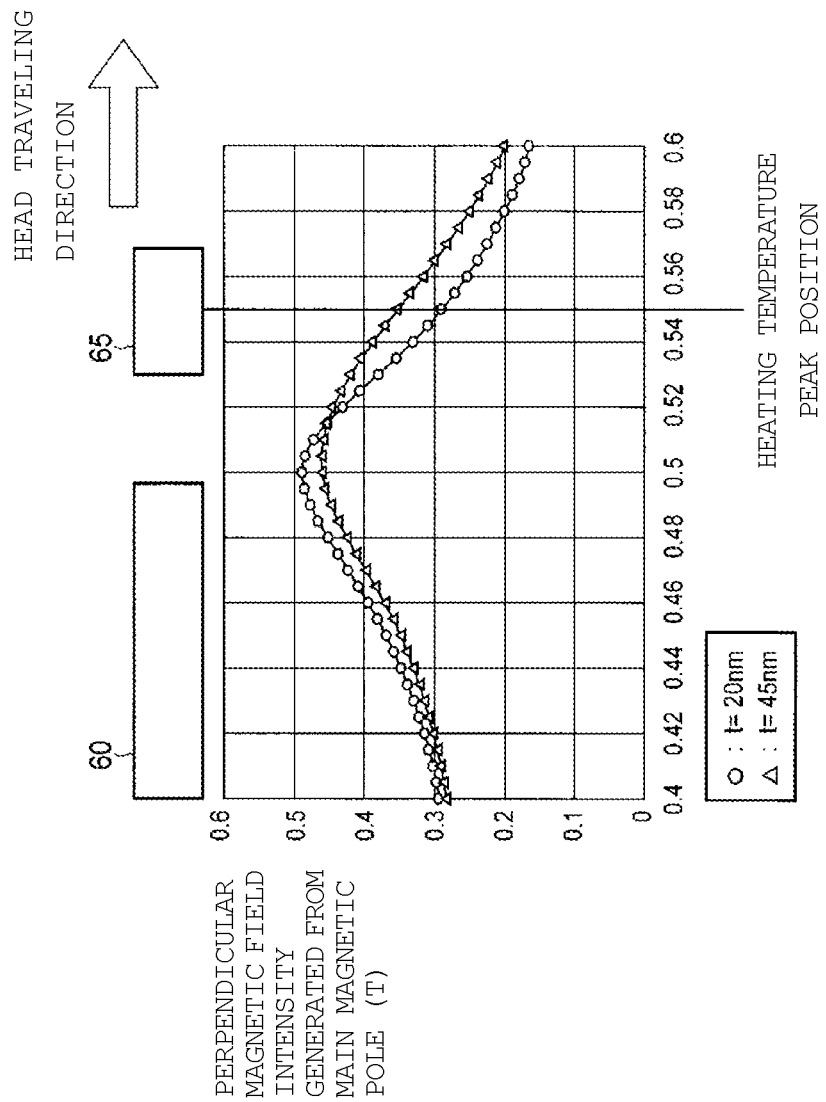
FIG. 11 is a view showing the relationship between an inclination width t of the magnetic pole end surface of the recording head and a magnetic field intensity generated from the main magnetic pole according to the first embodiment.

FIG. 11 shows the relationship between an inclination width t of the magnetic pole end surface 60b of the recording head according to the first embodiment and a magnetic field intensity distribution generated from the main magnetic pole 60. In FIG. 11, the magnetic field intensity generated from the main magnetic pole 60 in a perpendicular direction to a medium is plotted when the inclination width t varies with the gap length S set at 35 nm, the incline angle θ set at 65°, and the current flowing to the recording coil 70 set at 60 mA. A reference mark ○ is a magnetic field intensity profile of t=20 nm and a reference mark Δ is a magnetic field intensity profile of t=45 nm. Even at the same incline angle θ=65°, the magnetic field intensity applied by the head to the heated area may be more increased in the case of t=45 nm that satisfied the expression S<t.

A laser power by which it is possible to write to the recording layer 103 is 14 mW in the case of t=45 nm and 19 mW in the case of t=20 nm. Even at the same incline angle θ, the laser power may be apparently more reduced under the condition of S<t.

According to the HDD configured as described above, since a magnetic field intensity applied by the head to the heated area may be increased, a heating temperature necessary for recording may be reduced. As the result, the heated area in the magnetic recording medium may be restrained from spreading, hence to prevent erasure of information stored in the adjacent tracks. According to this, it is possible to obtain a magnetic recording head and a disk device including the same, capable of preventing erasure of data stored in the adjacent tracks and increasing a recording density.

Second Embodiment

Next, an HDD and a magnetic head according to a second embodiment will be described. In the second embodiment described below, the same reference numerals are given to the same portions as those mentioned above in connection with the first embodiment and their detailed description is omitted.

Figure 12:
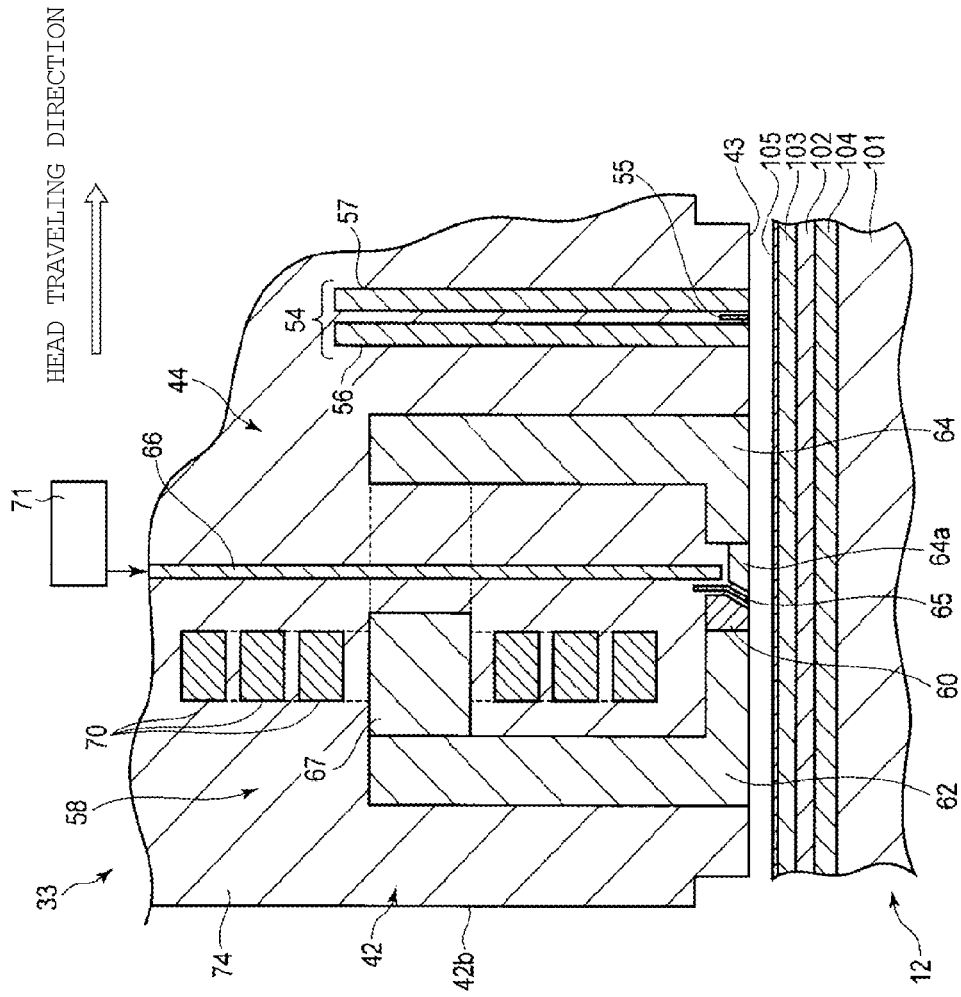
FIG. 12 is an enlarged cross-sectional view showing a head portion of a magnetic head in an HDD according to a second embodiment.
Figure 13:
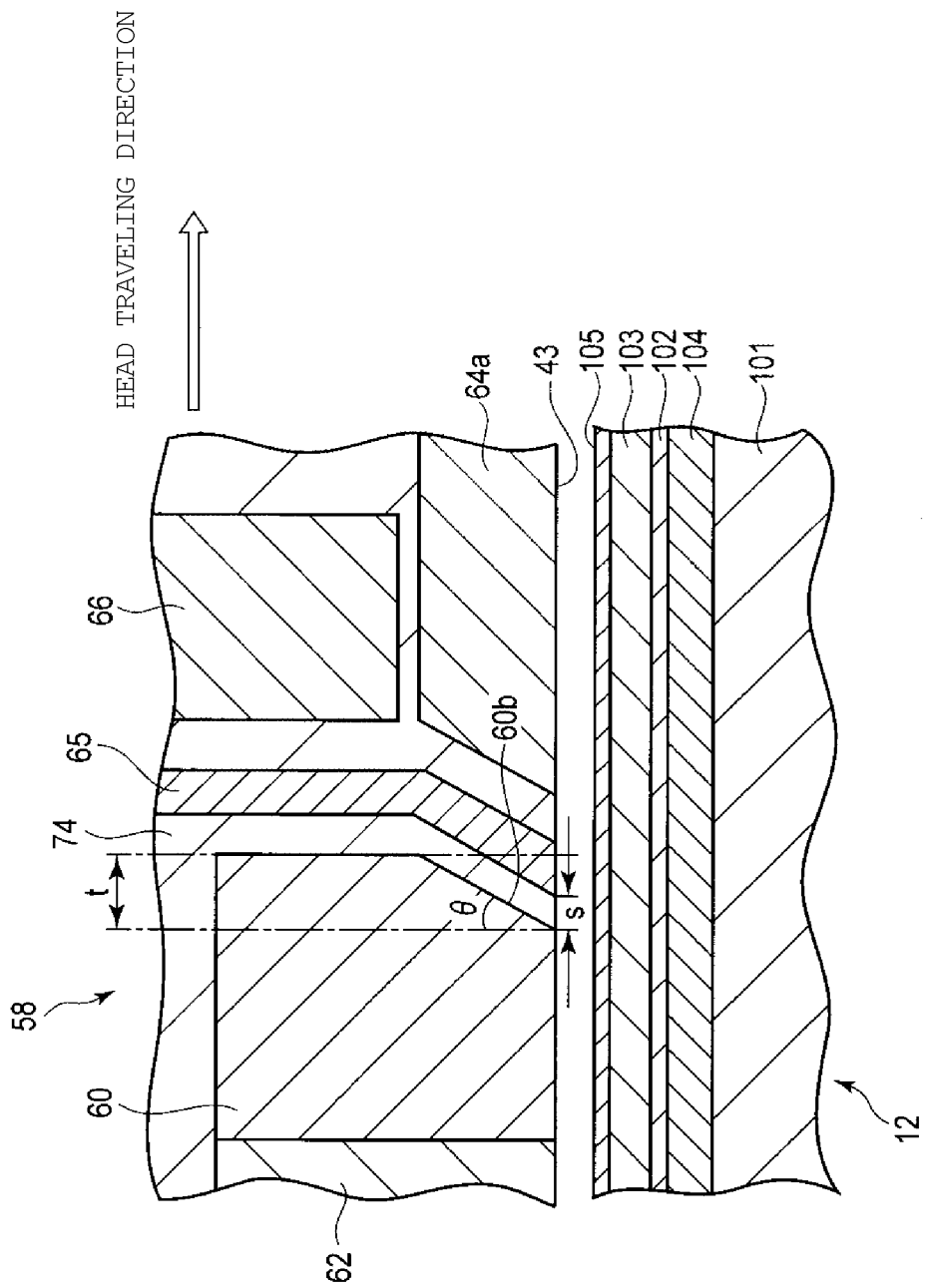
FIG. 13 is an enlarged cross-sectional view showing an end portion of the recording head on an ABS side.

FIG. 12 is an enlarged cross-sectional view showing the head portion of the magnetic head in the HDD according to the second embodiment and FIG. 13 is an enlarged cross-sectional view showing the end portion of the recording head on the ABS side.

As illustrated in FIGS. 12 and 13, according to the second embodiment, in a recording head 58 of the HDD, a lower end portion (extending end) of the waveguide 66 is positioned to be spaced apart from the ABS 43, that is, at a certain distance away from the ABS 43. The lower end portion of the waveguide 66 is positioned facing the upper portion of the near field light generating element 65.

The return shield magnetic pole 64 includes a distal end portion 64a positioned just below the waveguide 66 with an insulating layer interposed therebetween. The distal end portion 64a extends to the vicinity of the near field light generating element 65 and comes close to the main magnetic pole 60. Further, the distal end portion 64a is exposed on the ABS 43 and formed on the same plane as the ABS.

The other structure of the magnetic head 33 and the HDD is the same as that of the above mentioned first embodiment.

Figure 14:
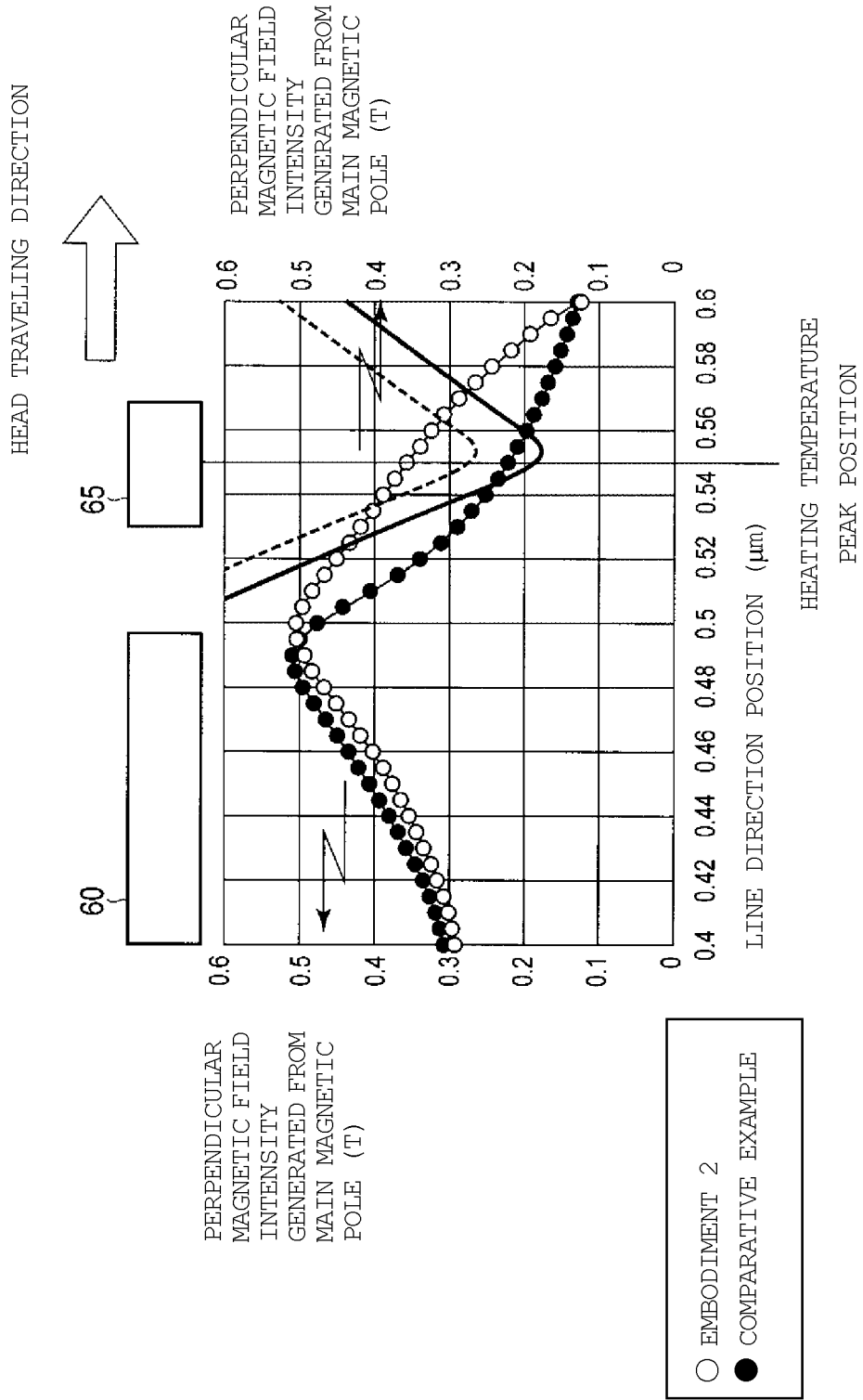
FIG. 14 is a view showing the relationship between a magnetic field intensity distribution and a coercive force in a recording layer for a recording head according to the second embodiment and a recording head according to a comparative example.

FIG. 14 shows the relationship between a magnetic field intensity distribution and a coercive force in the recording layer for a recording head according to the second embodiment and a recording head according to the comparative example. In the recording head according to the comparative example, the magnetic pole end surface of the main magnetic pole facing the near field light generating element extends in a direction perpendicular to the ABS. In the magnetic recording head according to the embodiment, an angle (incline angle) θ made by the magnetic pole end surface 60b facing the near field light generating element 65 and a film growing surface (a direction perpendicular to the ABS) is set to be 45° and a gap length S between the near field light generating element 65 and the main magnetic pole 60 on the ABS 43 is set to be 35 nm.

In FIG. 14, a line indicated by the plot of ○ shows a magnetic field intensity distribution generated from the main magnetic pole 60 in a perpendicular direction to a medium when a current flowing to the recording coil 70 is 60 mA, in the magnetic recording head according to the second embodiment. A line indicated by the plot of ● shows a magnetic field intensity distribution generated from the main magnetic pole in a perpendicular direction to a medium when a current flowing to the recording coil is 60 mA, in the recording head according to the comparative example.

In FIG. 14, a dotted characteristic line shows a change of a coercive force in the recording layer 103 when a laser power of a laser beam supplied from the laser diode 71 is set at 17 mW. A solid characteristic line indicates a change of a coercive force in the recording layer 103 when a laser power of 22 mW is applied.

When a laser power of 17 mW is applied, in the recording head 58 of the embodiment, there is an intersection of the coercive force in the recording layer 103 and the magnetic field intensity generated from the main magnetic pole 60 in a perpendicular direction to a medium; therefore, it is possible to write to the recording layer 103 and a good signal quality may be obtained. Further, by making the distal end portion 64a of the return shield magnetic pole 64 close to the near field light generating element 65 and the main magnetic pole 60, a magnetic field intensity generated from the main magnetic pole 60 is further increased, thus, it is possible to write a signal with a lower coercive force and at a lower heating temperature.

On the other hand, in the recording head of the comparative example, when a laser power of 17 mW is applied, there is no intersection of a coercive force in a medium recording layer and a magnetic field intensity generated from the main magnetic pole in a perpendicular direction to a medium and therefore, it is not possible to write to the recording layer. In the recording head according to the comparative example, it is necessary to apply a laser power of 22 mW there in order to determine a boundary of recording bits (in order to obtain an intersection of a coercive force in a medium recording layer and a magnetic field intensity generated from the main magnetic pole in a perpendicular direction to a medium). That is, a heating temperature of the recording medium has to be raised.

Even in the second embodiment configured as described above, since the head magnetic field intensity in the heated area may be increased, a heating temperature necessary for recording may be further reduced compared with the comparative example. As the result, the heated area in the magnetic recording medium may be restrained from spreading, hence to prevent erasure of information stored in the adjacent tracks. According to this, a magnetic recording head and a disk device including the same, capable of preventing erasure of data stored in the adjacent tracks and increasing a recording density, may be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, material, shape, sizes or the like of elements which constitute the head portion may be changed when necessary. In the magnetic disk device, the number of magnetic disks and the number of magnetic heads may be increased when necessary, and a size of the magnetic disk may be variously selected.

What is claimed is:

1. A magnetic recording head for recording information on a rotating recording medium of a storage drive, comprising:
   a main magnetic pole configured to generate a recording magnetic field in a direction perpendicular to a recording medium facing surface of the magnetic recording head; and
   a light generating element provided on a leading side of the main magnetic pole, and configured to generate light to heat the recording layer of the recording medium, wherein
   the main magnetic pole includes an end surface facing the light generating element, the end surface being inclined with respect to the direction perpendicular to the recording medium facing surface so that the end surface faces toward the recording medium.

2. The magnetic recording head according to claim 1, wherein the light generating element has an end surface facing the end surface of the main magnetic pole and is parallel thereto.

3. The magnetic recording head according to claim 2, wherein the end surfaces of the main magnetic pole and the light generating element are separated by an insulating layer.

4. The magnetic recording head according to claim 3, wherein
   the end surfaces of the main magnetic pole and the light generating element are positioned with respect to each other so that at least a part of the end surface of the main magnetic pole overlaps with the end surface of the light generating element in the direction perpendicular to the recording medium facing surface.

5. The magnetic recording head according to claim 1, wherein an angle of incline of the end surface of the main magnetic pole, with respect to the direction perpendicular to the recording medium facing surface, is in a range of $0° < \theta < 90°$.

6. The magnetic recording head according to claim 1, wherein
   when a gap length between the end surface and the light generating element is defined as S on the medium facing surface and a distance between a trailing end and a leading end of the end surface is defined as t in a vicinity on the medium facing side, a relation of S<t is satisfied.

7. The magnetic recording head according to claim 1, further comprising:
   a waveguide which propagates light to the light generating element and has an end surface that is parallel to the end surface of the main magnetic pole.

8. The magnetic recording head according to claim 1, further comprising:
   a waveguide which propagates light to the light generating element, and
   a return shield magnetic pole provided on a leading side of the main magnetic pole, and arranged between an end portion of the waveguide and the recording layer in the direction perpendicular to the recording medium facing surface.

9. A disk device comprising:
   a disk shaped recording medium including a recording layer having a magnetic anisotropy in a direction perpendicular to a surface of the recording medium;
   a driving unit configured to rotate the recording medium; and
   a magnetic recording head including a main magnetic pole configured to generate a recording magnetic field in the direction perpendicular to a recording medium facing surface of the magnetic recording head, and a light generating element provided on a leading side of the main magnetic pole and configured to generate light to heat the recording layer of the recording medium, wherein
   the main magnetic pole includes an end surface facing the light generating element, the end surface being inclined with respect to the direction perpendicular to the recording medium facing surface so that the end surface faces toward the recording medium.

10. The device according to claim 9, wherein the light generating element has an end surface facing the end surface of the main magnetic pole and is parallel thereto.

11. The device according to claim 10, wherein the end surfaces of the main magnetic pole and the light generating element are separated by an insulating layer.

12. The device according to claim 11, wherein
the end surfaces of the main magnetic pole and the light generating element are positioned with respect to each other so that at least a part of the end surface of the main magnetic pole overlaps with the end surface of the light generating element in the direction perpendicular to the recording medium facing surface.

13. The device according to claim 9, wherein an angle of incline of the end surface of the main magnetic pole, with respect to the direction perpendicular to the recording medium facing surface, is in a range of $0°<\theta<90°$.

14. The device according to claim 9, wherein
when a gap length between the end surface and the light generating element is defined as S on the medium facing surface and a distance between a trailing end and a leading end of the end surface is defined as t in a vicinity on the medium facing side, a relation of S<t is satisfied.

15. The device according to claim 9, wherein the magnetic recording head further comprises:
a waveguide which propagates light to the light generating element and has an end surface that is parallel to the end surface of the main magnetic pole.

16. The device according to claim 9, wherein the magnetic recording head further comprises:
a waveguide which propagates light to the light generating element, and
a return shield magnetic pole provided on a leading side of the main magnetic pole, and arranged between an end portion of the waveguide and the recording layer in the direction perpendicular to the recording medium facing surface.

17. A magnetic recording head for recording information on a rotating recording medium of a storage drive, comprising:
a main magnetic pole configured to generate a recording magnetic field in a direction perpendicular to a recording medium facing surface of the magnetic recording head; and
a light generating element provided on a leading side of the main magnetic pole, and configured to generate light to heat the recording layer of the recording medium, wherein
end portions of the main magnetic pole and the light generating element facing the recording layer are separated by an insulating layer, and are positioned with respect to each other so that at least a part of the end portion of the main magnetic pole overlaps with the end portion of the light generating element in the direction perpendicular to the recording medium facing surface, and wherein the end portion of the main magnetic pole is inclined with respect to the direction perpendicular to the recording medium facing surface so that the end portion faces toward the recording medium.

18. The magnetic recording head according to claim 17, wherein
when a gap length between an end surface of the main magnetic pole and the light generating element is defined as S on the medium facing surface and a distance between a trailing end and a leading end of the end surface is defined as t in a vicinity on the medium facing side, a relation of S<t is satisfied.

19. The magnetic recording head according to claim 17, further comprising:
a waveguide which propagates light to the light generating element, wherein
the end portions of the main magnetic pole and the light generating element, and an end portion of the waveguide each has an end surface that is inclined by substantially the same angle with respect to the direction perpendicular to the recording medium facing surface.

20. The magnetic recording head according to claim 19, wherein an angle of incline of the end surfaces of the main magnetic pole, the light generating element, and the waveguide, with respect to the direction perpendicular to the recording medium facing surface, is in a range of $0°<\theta<90°$.

* * * * *